United States Patent
Cho et al.

(10) Patent No.: US 7,241,027 B2
(45) Date of Patent: Jul. 10, 2007

(54) ILLUMINATION SYSTEM PROVIDING LIGHT OF GAUSSIAN DISTRIBUTION, PROJECTION SYSTEM, AND METHOD OF FORMING COLOR IMAGE

(75) Inventors: Kun-ho Cho, Suwon-si (KR); Dae-sik Kim, Suwon-si (KR); Sung-ha Kim, Seoul (KR); Hee-joong Lee, Anyang-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 197 days.

(21) Appl. No.: 10/805,493

(22) Filed: Mar. 22, 2004

(65) Prior Publication Data

US 2004/0246586 A1    Dec. 9, 2004

Related U.S. Application Data

(60) Provisional application No. 60/455,854, filed on Mar. 20, 2003.

(30) Foreign Application Priority Data

May 12, 2003   (KR)  ...................... 10-2003-0029753

(51) Int. Cl.
   *G02B 27/12*   (2006.01)
(52) U.S. Cl. ...................... 362/268; 362/331; 359/434; 359/435; 359/623; 359/624
(58) Field of Classification Search ................ 362/268, 362/331, 339; 353/31, 34; 359/623, 626, 359/434, 435, 619, 624
See application file for complete search history.

(56) References Cited

U.S. PATENT DOCUMENTS

| | | | | |
|---|---|---|---|---|
| 3,484,599 | A | * | 12/1969 | Little ......................... 362/268 |
| 3,555,987 | A | * | 1/1971 | Browning ................... 359/626 |
| 5,098,184 | A | * | 3/1992 | van den Brandt et al. .. 359/622 |
| 5,900,982 | A | | 5/1999 | Dolgoff et al. |
| 6,212,013 | B1 | * | 4/2001 | Kodama et al. ............. 359/634 |
| 6,431,727 | B1 | * | 8/2002 | Sugawara et al. .......... 362/332 |
| 6,513,953 | B1 | * | 2/2003 | Itoh ............................ 362/331 |
| 6,611,381 | B2 | * | 8/2003 | Kodama et al. ............ 359/619 |

(Continued)

OTHER PUBLICATIONS

Japanese Abstract No. 2000187178, dated Jul. 4, 2000.

(Continued)

*Primary Examiner*—Jong-Suk (James) Lee
*Assistant Examiner*—Ismael Negron
(74) *Attorney, Agent, or Firm*—Sughrue Mion, PLLC

(57) ABSTRACT

An illumination system includes a light source, first and second cylindrical lens arrays, and a relay lens. The first cylindrical lens array includes a plurality of cylindrical lens cells which divide light emitted from the light source into a plurality of beams. The second cylindrical lens array includes a plurality of cylindrical lens cells which combine the beams divided by the cylindrical lens cells in an identical direction. The relay lens relays beams passed through the second cylindrical lens array so that most of the beams are concentrated on an incident light axis to have a Gaussian distribution. Accordingly, light passed through slits for controlling the divergence angle of incident light or the etendue of an optical system has a Gaussian distribution in a color separation direction or a color scrolling direction.

18 Claims, 10 Drawing Sheets

U.S. PATENT DOCUMENTS

| | | | |
|---|---|---|---|
| 6,688,747 B2* | 2/2004 | Wichner et al. | 353/29 |
| 6,688,756 B1* | 2/2004 | Akiyama | 362/268 |
| 2002/0024740 A1* | 2/2002 | Hashimoto | 359/623 |
| 2002/0191154 A1 | 12/2002 | Shahzad et al. | |
| 2003/0030776 A1 | 2/2003 | Jeon | |
| 2003/0128543 A1* | 7/2003 | Rekow | 362/268 |

OTHER PUBLICATIONS

Japanese Abstract No. 11125776, dated May 11, 1999.

* cited by examiner

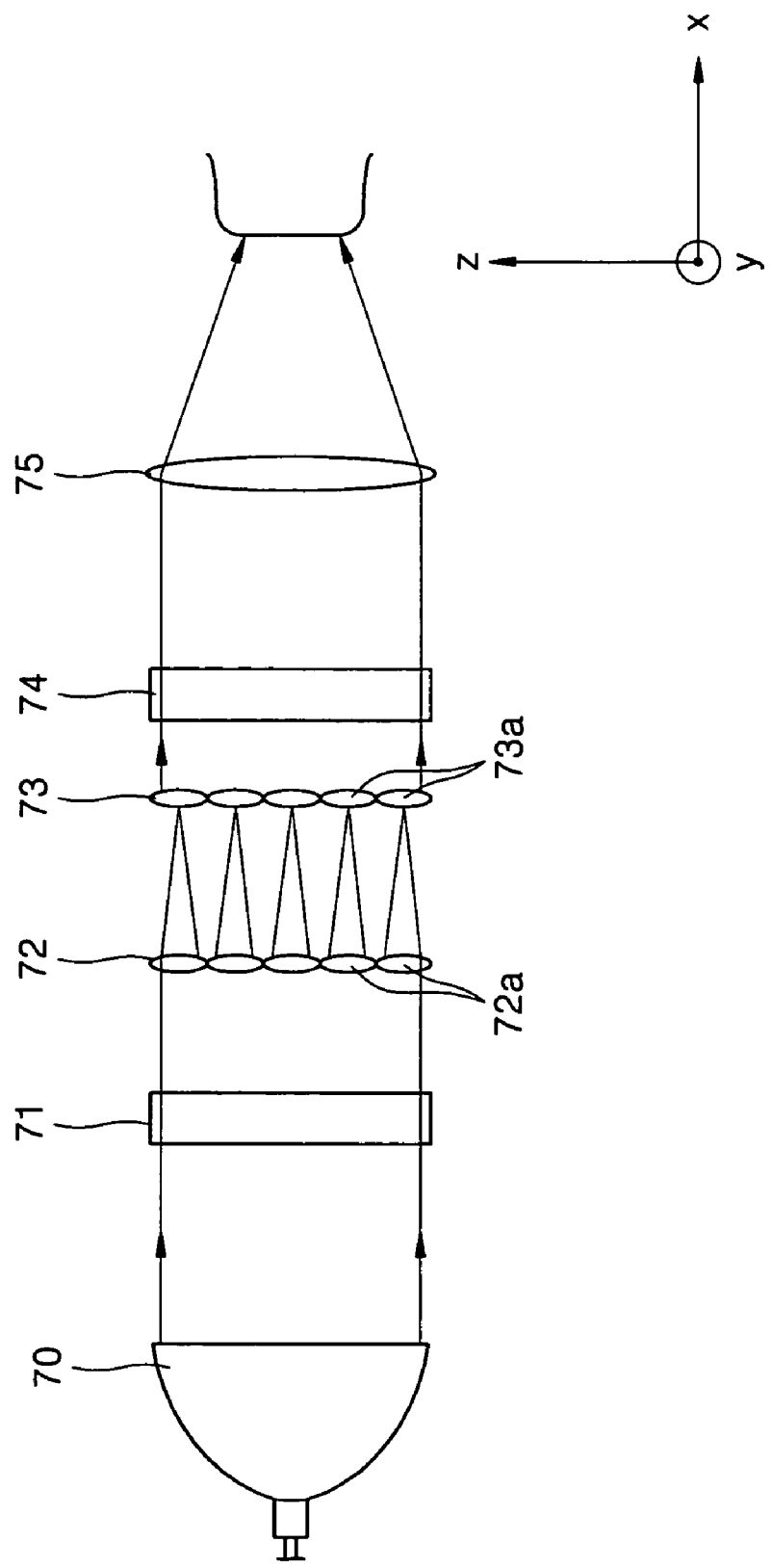

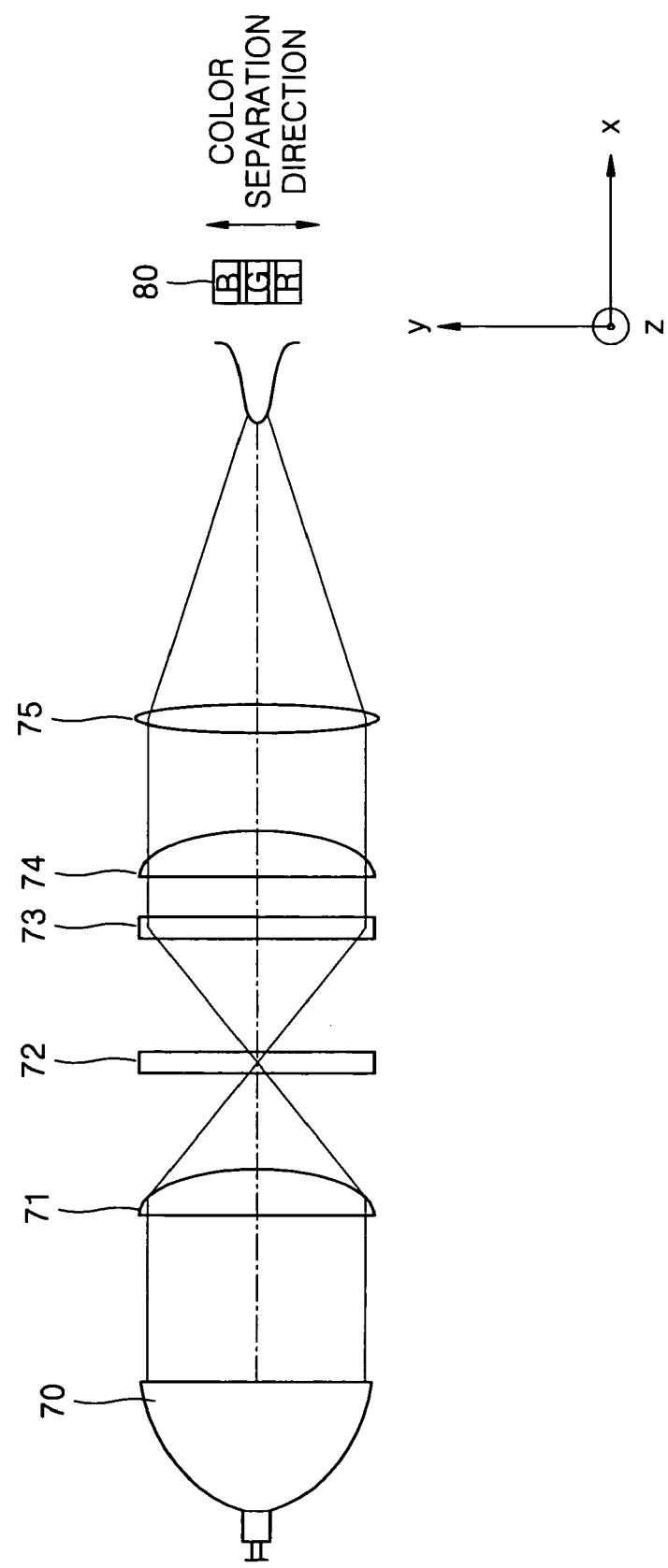

113(134,143)

E

← COLOR SEPARATION
   DIRECTION →

← COLOR SEPARATION
   DIRECTION →

ILLUMINATION SYSTEM PROVIDING LIGHT OF GAUSSIAN DISTRIBUTION, PROJECTION SYSTEM, AND METHOD OF FORMING COLOR IMAGE

This application is based on and claims priority from Korean Patent Application No. 2003-29753, filed May 12, 2003 in the Korean Intellectual Property Office, and U.S. Patent Application No. 60/455,854, filed Mar. 20, 2003 in U.S. Patent and Trademark Office, the disclosures of which are incorporated herein in their entirety by reference.

BACKGROUND OF THE INVENTION

1. Field of the Invention

The present invention relates to an illumination system which forms a color image using a scrolling operation, a projection system, and a method of forming a color image, and more particularly, to an illumination system which improves the optical efficiency by providing light having a Gaussian distribution in a color scrolling direction to a slit, a projection system using the illumination system, and a method of forming a color image.

2. Description of the Related Art

Projection systems are classified as 3-panel projection systems or as single-panel projection systems according to the number of light valves for controlling the on/off operation of light emitted from a high-output lamp on a pixel-by-pixel basis and forming a picture. Single-panel projection systems can have a smaller optical system than three-panel projection systems but provide an optical efficiency of ⅓ less than that of three-panel projection systems because R, G, and B colors into which white light is separated are used in a sequential method. As a result, attempts to increase the optical efficiency of single-panel projection systems have been made.

In a conventional single-panel projection system, light radiated from a white light source is separated into R, G, and B colors using a color filter, and the three colors are sequentially transmitted to a light valve. The light valve appropriately operates according to the sequence of colors received and creates images. As described above, a single-panel optical system sequentially uses colors, so the light efficiency is reduced to ⅓ of the light efficiency of a three-panel optical system. A color scrolling method has been proposed to solve this problem, wherein white light is separated into R, G, and B colors, and the R, G and B colors are simultaneously sent to different locations on a light valve. Since an image cannot be produced until all of R, G, and B colors for each pixel reach the light valve, color bars are periodically scrolled.

In a conventional single-panel scrolling projection system, as shown in FIG. 1, white light emitted from a light source 100 passes through first and second lens arrays 102 and 104 and a polarized beam splitter array 105 and is separated into R, G, and B beams by first through fourth dichroic filters 109, 112, 139, and 141. In particular, the red beam R and the green beam G, for example, are transmitted by the first dichroic filter 109 and travel along a first light path $L_1$, while the blue beam B is reflected by the first dichroic filter 109 and travels along a second light path $L_2$. The red beam R and the green beam G on the first light path $L_1$ are separated by the second dichroic filter 112. The second dichroic filter 112 transmits the red beam R along the first light path $L_1$ and reflects the green beam G along a third light path $L_3$.

First, second, and third prisms 114, 135, and 142 are rotatable and disposed on the first, second, and third light paths $L_1$, $L_2$, and $L_3$, respectively. The light emitted from the light source 100 is separated into the red beam R, the green beam G, and the blue beam B, and they are scrolled while passing through corresponding first through third prisms 114, 135, and 142. As the first through third prisms 114, 135 and 142 rotate at a uniform speed, R, G, and B color bars are scrolled. The green beam G and the blue beam B that travel along the second and third light paths $L_2$ and $L_3$, respectively, are transmitted and reflected by the third dichroic filter 139, respectively, and then combined. Finally, the R, G, and B beams are combined by the fourth dichroic filter 141. The combined beam is transmitted by a polarized beam splitter 127 and forms a picture using a light valve 130.

A condensing lens 107 is disposed next to the polarized beam splitter array 105, and light path correction lenses 110, 117, 131, 137, and 145 are disposed along the first through third light paths $L_1$, $L_2$, and $L_3$. Condensing lenses 120 and 140 are disposed between the first and fourth dichroic filters 109 and 141 and between the third and fourth dichroic filters 139 and 141, respectively. A focusing lens 124 and a polarizer 125 are disposed on the light path between the fourth dichroic filter 141 and the polarized beam splitter 127. Light path changers, for example, mirrors 118 and 133, are further disposed on the first and third light paths $L_1$ and $L_3$, respectively.

The scrolling of the R, G, and B color bars due to rotation of the first, second and third prisms 114, 135, and 142 is shown in FIG. 2. Scrolling represents the periodic movement of color bars formed on the surface of the light valve 130 when the first, second, and third prisms corresponding to R, G, and B colors are synchronously rotated. As described above, when R, G, and B color bars circulate one cycle, one frame of a color image is formed.

The light valve 130 processes an image signal for each pixel and forms a picture. The formed picture is magnified by a projecting lens (not shown), and the magnified picture is projected on a screen.

First, second, and third slits 113, 134, and 143 are installed in front of the first, second, and third prisms 114, 135, 142, respectively, and adjust a diverging angle (or etendue) of incident light. Etendue denotes an optical conservation quantity in an optical system. The widths of the color bars vary according to the widths of the first, second, and third slits 113, 134, and 143. If the slit widths decrease, the R, G, and B color bars are narrowed such that black bars K are formed between adjacent color bars as illustrated in FIG. 3A. On the other hand, if the slit widths increase, the R, G, and B color bars are enlarged such that overlapping portions P are formed between adjacent color bars as illustrated in FIG. 3B.

FIG. 3C shows the R, G, and B color bars formed on the light valve 130 and an optical intensity distribution for each of the R, G, and B color bars with respect to a color separation direction. The light emitted from the light source 100 has a Gaussian distribution. The light passed through the first and second lens arrays 102 and 104 has a square distribution, where the light is uniformly distributed in vertical and horizontal directions on a plane perpendicular to an optical axis. The light having a square distribution is separated into color beams, and the separated color beams travel along the first through third light paths $L_1$, $L_2$, and $L_3$. The color beams pass through the first through third slits 113, 134, and 143, respectively, which remove rays that diverge at angles greater than an acceptable angle of an illumination system and thus contribute to a neat separation of color bars.

A distribution of light incident upon each of the slits 113, 134, and 143 and light D blocked thereby are shown in FIG. 3D. Since the light incident upon each of the first through third slits 113, 134, and 143 has a square distribution, a large amount of light D is removed by each of the slits 113, 134, and 143. As described above, the widths of the color bars is controlled using the slits 113, 134, and 143 to control the divergence angle or etendue of light having a square distribution. However, the removal of the large amount of light D by the slits 113, 134, and 143 disadvantageously affects the optical efficiency.

SUMMARY OF THE INVENTION

The present invention provides an illumination system which improves the optical efficiency by passing light with a Gaussian distribution through a slit and a projection system using the illumination system.

The present invention also provides a method of efficiently forming a color image, in which light with a Gaussian distribution passes through slits, the widths of color bars formed on a light valve are controlled using the slits, and the color bars are scrolled.

According to an aspect of the present invention, there is provided an illumination system comprising: a light source; a first cylindrical lens array which includes a plurality of cylindrical lens cells, each of which divides light emitted from the light source into a plurality of beams; a second cylindrical lens array which includes a plurality of cylindrical lens cells which combine the beams divided by the cylindrical lens cells in an identical direction; and a relay lens which relays beams passed through the second cylindrical lens array so that most of the beams are concentrated on an incident light axis to have a Gaussian distribution.

The illumination system further comprises: a first cylinder lens which converges the light emitted from the light source; and a second cylinder lens which is disposed between the first and second cylindrical lens arrays or behind the second cylindrical lens array and which collimates incident light.

The cylindrical lens cells of each of the first and second cylindrical lens arrays are arranged in a direction perpendicular to a thickness direction of the first and second cylinder lenses.

According to another aspect of the present invention, there is provided a projection system in which light emitted from the above-described illumination system is separated into a plurality of color beams by a color separator, the color beams are scrolled by a scrolling unit, and a color image is thus formed on a light valve.

The color separator comprises: a first dichroic filter which reflects a first color beam of light emitted from the illumination system and transmits other color beams; and a second dichroic filter which reflects a second color beam of the color beams transmitted by the first dichroic filter and transmits a third color beam.

The scrolling unit includes prisms rotatably disposed on light paths along which the color beams travel, and color scrolling is achieved by rotations of the prisms.

The projection system further comprises slits which are disposed on paths along which the color beams travel and which control the divergence angles of the color beams.

The projection system further comprises a polarization conversion system which is disposed on a light path between the first cylinder lens and the relay lens and which converts incident light into light having a single polarization.

According to still another aspect of the present invention, there is provided a method of forming a color image on a light valve by separating light emitted from a light source into a plurality of color beams using a color separator and by scrolling the color beams using a scrolling unit. In this method, the light emitted from the light source is processed to have a Gaussian distribution in a color separation direction by combining light emitted from the light source in a direction perpendicular to the color separation direction and concentrating most of the light on an incident light axis in the color separation direction. Thereafter, the divergence angle of light having a Gaussian distribution is controlled by using slits.

The step of processing the light emitted from the light source to have a Gaussian distribution comprises the substeps of: dividing the light emitted from the light source into a plurality of beams by using a first cylindrical lens array having cylindrical lens cells arranged parallel to one another in a color separation direction such that light incident upon each of the cylindrical lens cells is divided into a plurality of beams; combining the beams obtained by the first cylindrical lens array by using a second cylindrical lens array; and concentrating most of the combined beams passed through the second cylindrical lens array on an incident light axis by using a relay lens so that the light emitted from the light source has a Gaussian distribution in the color separation direction.

The method further comprises: converging the light emitted from the light source on the first cylindrical lens array by using a first cylinder lens; and collimating the combined beams passed through the second cylindrical lens array by using a second cylinder lens.

BRIEF DESCRIPTION OF THE DRAWINGS

The above and other features and advantages of the present invention will become more apparent by describing in detail exemplary embodiments thereof with reference to the attached drawings in which:

FIG. 5A is a front view of the illumination system of FIG. 4;

FIG. 5B is a top view of the illumination system of FIG. 4;

DETAILED DESCRIPTION OF THE INVENTION

Figure 1:
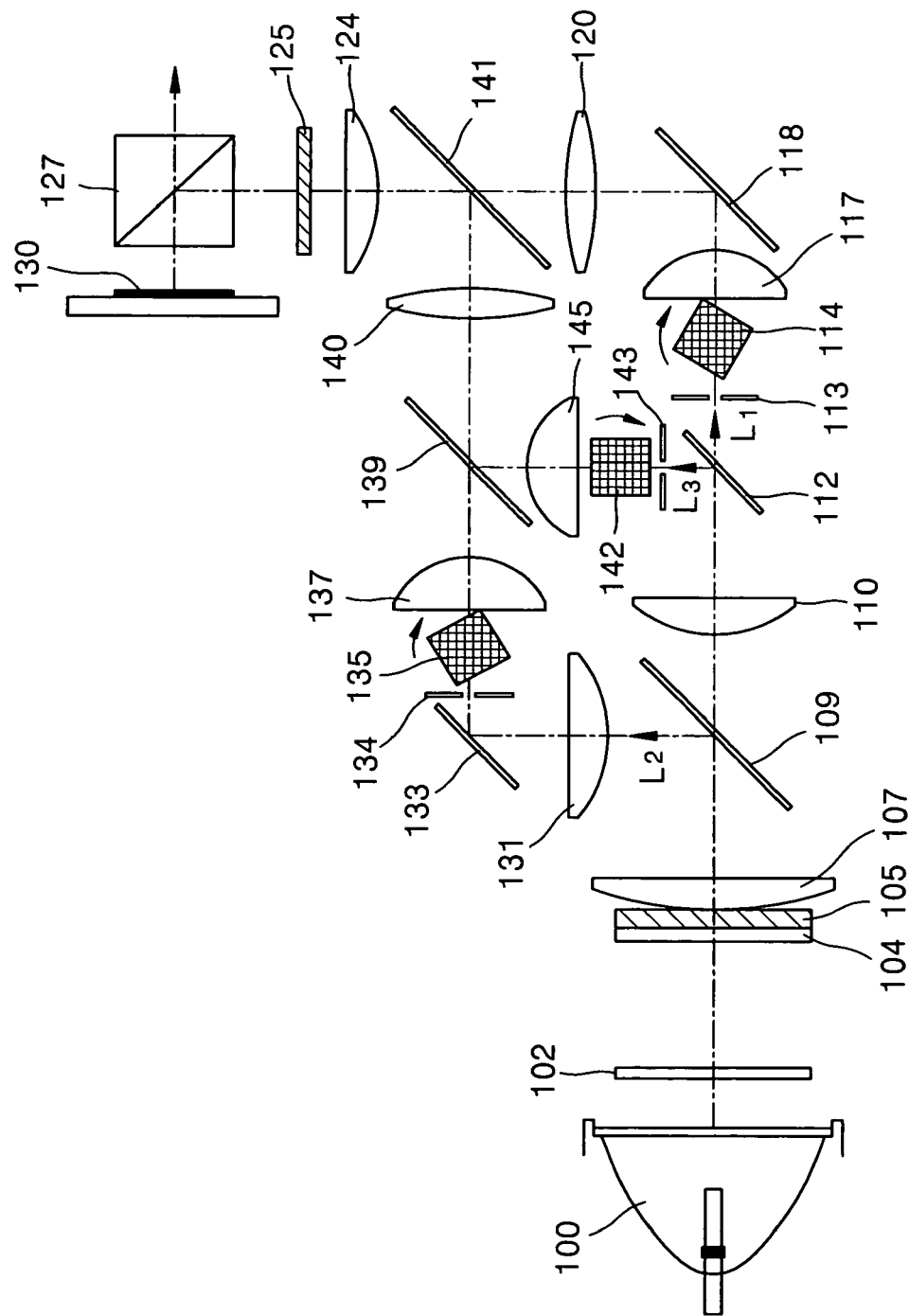
FIG. 1 is a schematic diagram of a conventional projection system.
Figure 2:
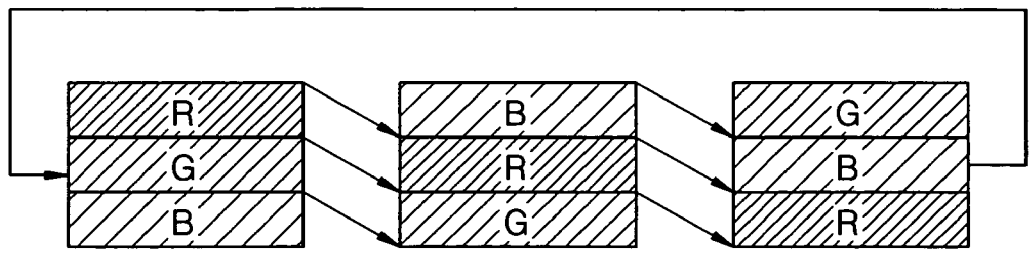
FIG. 2 illustrates R, G, and B color bars to explain a color scrolling operation of the conventional projection system of FIG. 1.
Figure 3A:
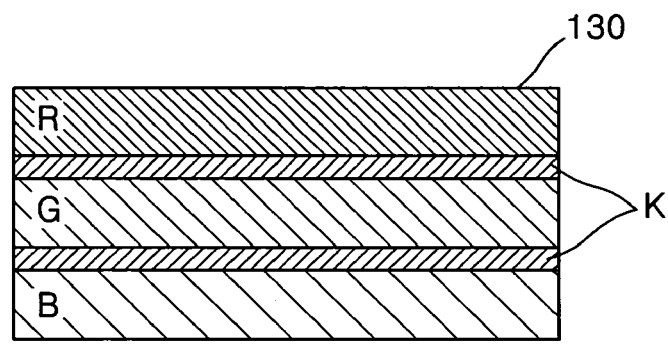
FIGS. 3A and 3B illustrate color bars formed on a light valve used in a projection system for forming a color image using a scrolling technique.
Figure 3B:
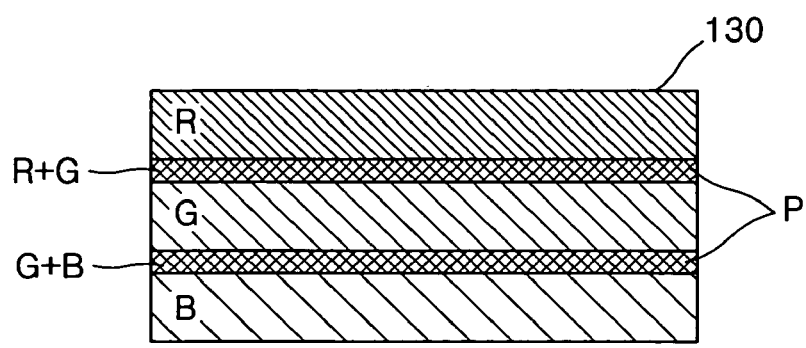
Figure 3C:
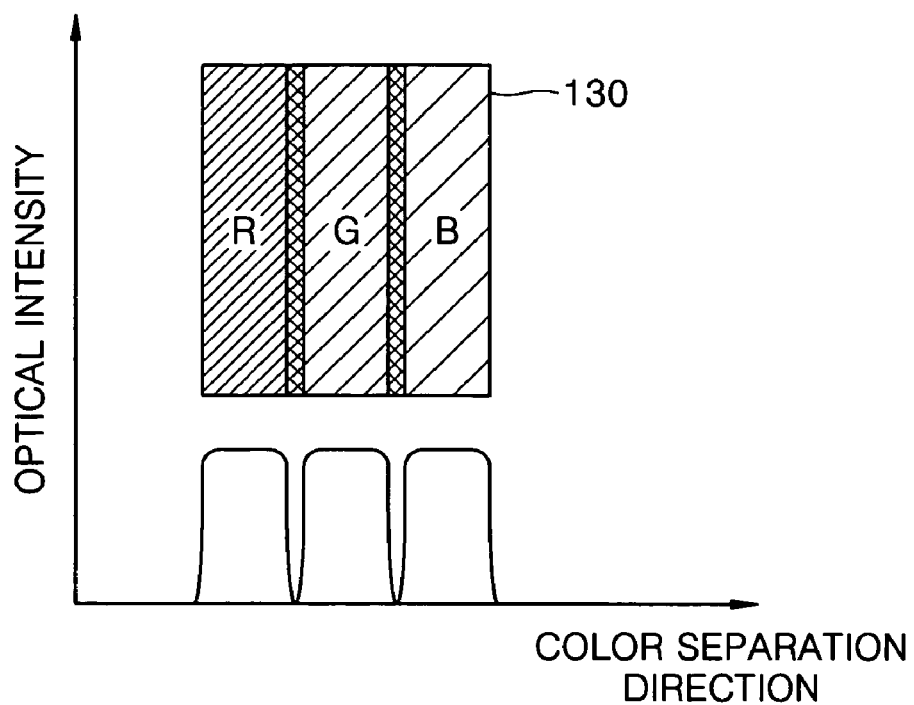
FIG. 3C illustrates the R, G, and B color bars formed on the light valve of FIG. 1 and an optical intensity distribution for each of the R, G, and B color bars versus a color separation direction.
Figure 3D:
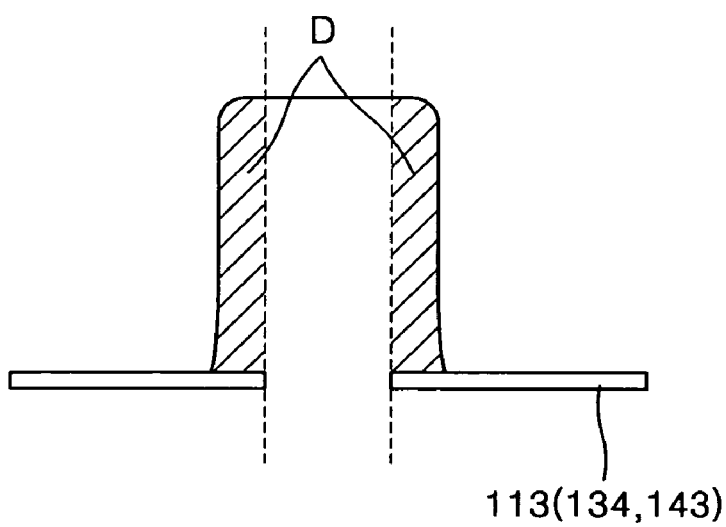
FIG. 3D illustrates a distribution of light incident upon each of the slits of FIG. 1 and some of the incident light that is removed by each of the slits.
Figure 4:
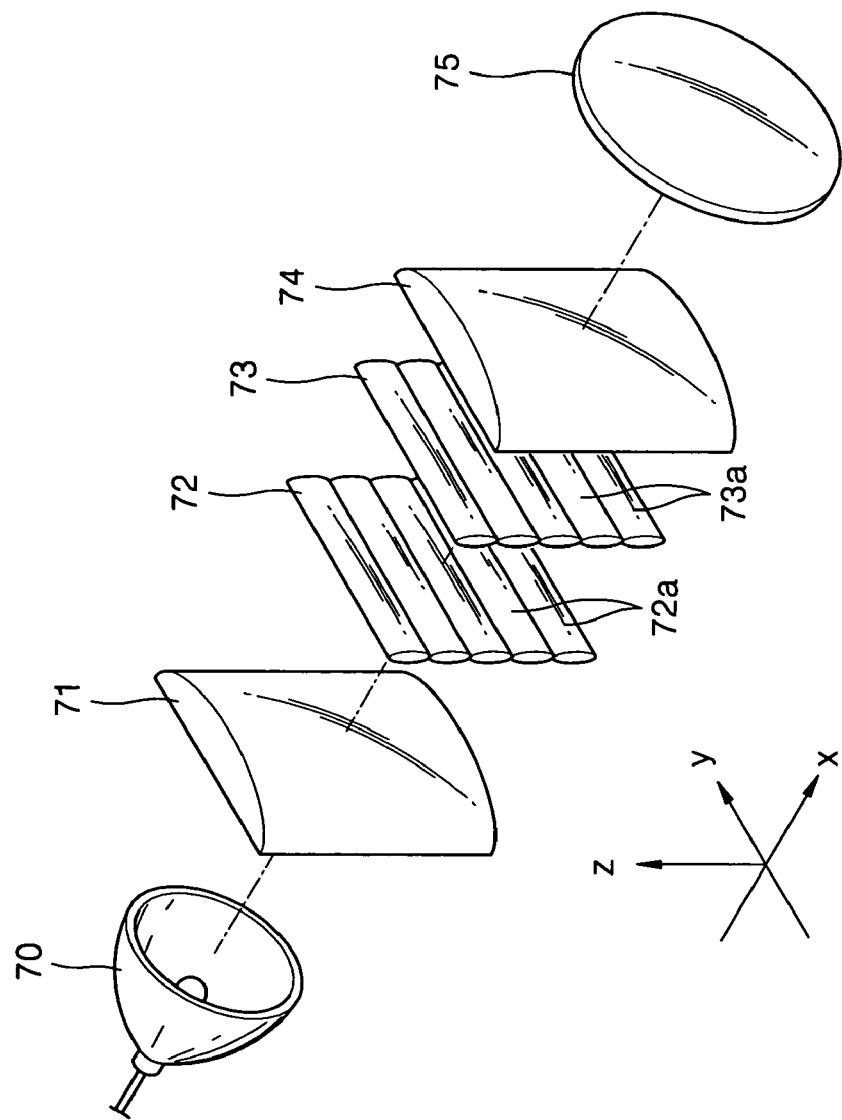
FIG. 4 is a perspective view of an illumination system which provides light with a Gaussian distribution according to an exemplary embodiment of the present invention.

Referring to FIG. 4, an illumination system according to an exemplary embodiment of the present invention includes a light source 70, a first cylindrical lens array 72 having a plurality of cylindrical lens cells 72a, and a second cylindrical lens array 73 which is disposed a predetermined interval apart from the first cylindrical lens array 72 and which has a plurality of cylindrical lens cells 73a. The first and second cylindrical lens arrays 72 and 73 are formed by arranging the lens cells 72a and 73a, respectively, in an identical direction.

A first cylindrical lens 71 is disposed between the light source 70 and the first cylindrical lens array 72. A second cylindrical lens 74 is disposed behind the second cylindrical lens array 73. Alternatively, the second cylindrical lens 74 may be disposed between the first and second cylindrical lens arrays 72 and 73. A relay lens 75 is further installed to relay light passed through the second cylindrical lens 74 so that the light is overlapped on a predetermined area of a light valve (not shown in FIG. 4).

A distribution of light obtained by the illumination system of FIG. 4 will now be described with reference to FIG. 5A, which is a front view of the illumination system of FIG. 4 (on an x-z plane), and FIG. 5B, which is a top view of the illumination system of FIG. 4 (on an x-y plane).

Referring to FIG. 5A, light emitted from the light source 70 passes through the first cylindrical lens 71 without change. Then, while passing through the first cylindrical lens array 72, light is divided into a plurality of beams by each of the cylindrical lens cells 72a. The divided beams are combined by the second cylindrical lens array 73 in the direction of an arrangement of the cylindrical lens cells 73a (i.e., in direction z). While passing through the second cylindrical lens 74 and the relay lens 75, the combined light has a square distribution with respect to direction z.

Referring to FIG. 5B, light emitted from the light source 70 is focused on the first cylindrical lens array 72 via the first cylinder lens 71. The focused light is diverged while passing through the first cylindrical lens array 72. The diverged light is collimated while passing through the second cylindrical lens array 73 and the second cylinder lens 74. While passing through the relay lens 75, the collimated light is incident on a center of a light valve 80 to have a Gaussian distribution with respect to direction y.

Preferably, but not necessarily, the cylindrical lens cells 72a and 73a of the first and second cylindrical lens arrays 72 and 73 are arranged in a direction (i.e., direction z) perpendicular to the thickness direction (i.e., direction x) of the first and second cylinder lenses 71 and 74. In other words, the cylindrical lens cells 72a and 73a are arranged in a direction (i.e., direction z) perpendicular to a color separation direction which will be described later.

When a projection system using the illumination system having such a structure forms a color image using a color scrolling technique, the light emitted from the illumination system preferably, but not necessarily, has a Gaussian distribution in a scrolling direction of R, G, and B color bars formed on the light valve 80 (i.e., in a color separation direction). The color bar scrolling direction (or the color separation direction) will be described later. However, the light emitted from the illumination system of FIG. 4 may have a square distribution in the length direction (i.e., direction z) of the color bars as illustrated in FIG. 5A.

Figure 6:
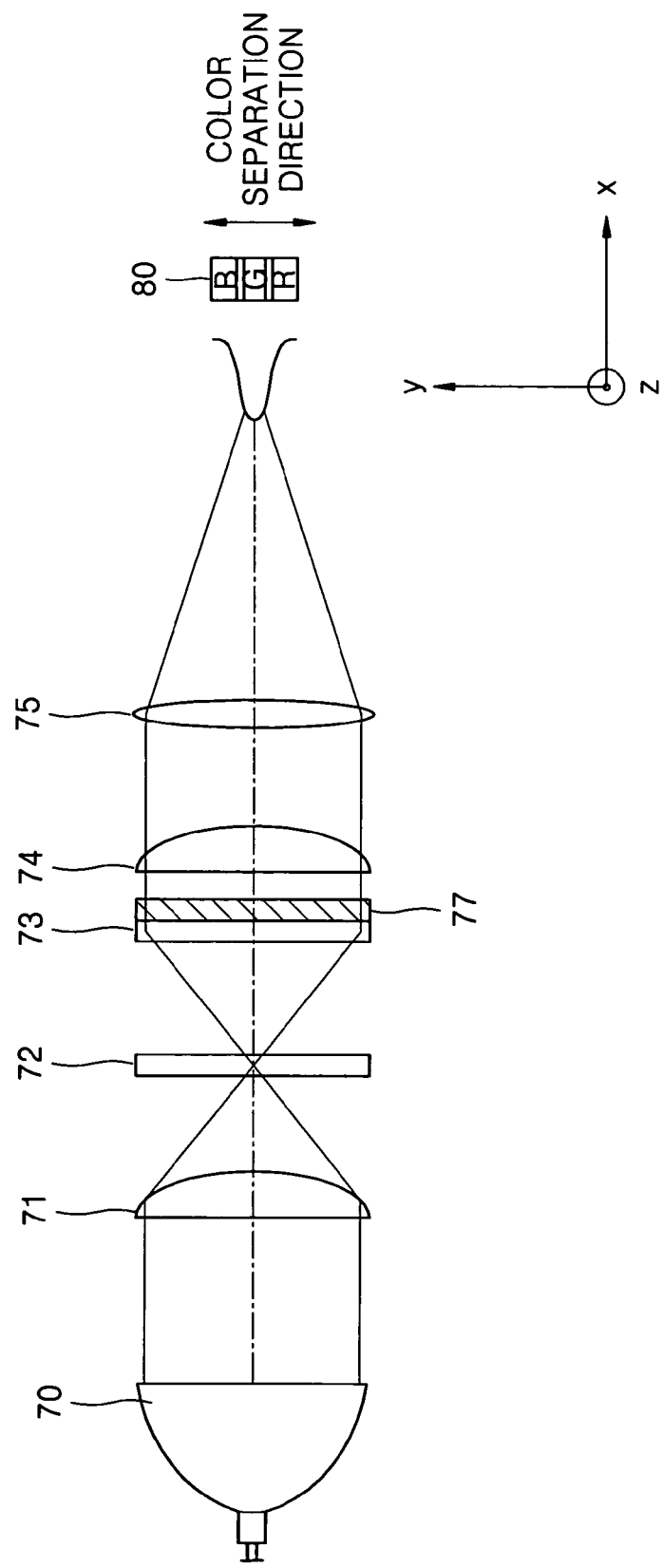
FIG. 6 is a top view of an illumination system which further includes a polarization conversion system compared with the illumination system of FIG. 4.

In order to utilize light having a single polarization, an illumination system according to an exemplary embodiment of the present invention of FIG. 6 further includes a polarization conversion system 77 which converts light emitted from the light source 70 into light having a single polarization. The polarization conversion system 77 may be disposed on a light path between the light source 70 and the relay lens 75, more preferably, between the second cylindrical lens array 73 and the second cylinder lens 74. The polarization conversion system 77 may be constructed with a polarization beam splitter array and a ½ wavelength plate and converts the light emitted from the light source 70 into light with a single polarization, for example, a P polarization or an S polarization. Since the structure and operation of the polarization conversion system 77 are well known, the description thereof will be omitted. A projection system using the illumination system of FIG. 6 may use a liquid crystal display (LCD) or a liquid crystal on silicon (LCOS) as a light valve 80.

A projection system according to an exemplary embodiment of the present invention includes the illumination system of FIG. 4 or 6 so that light having a Gaussian distribution can be incident upon a slit for controlling the etendue of an optical system or the divergence angle of incident light.

Figure 7:
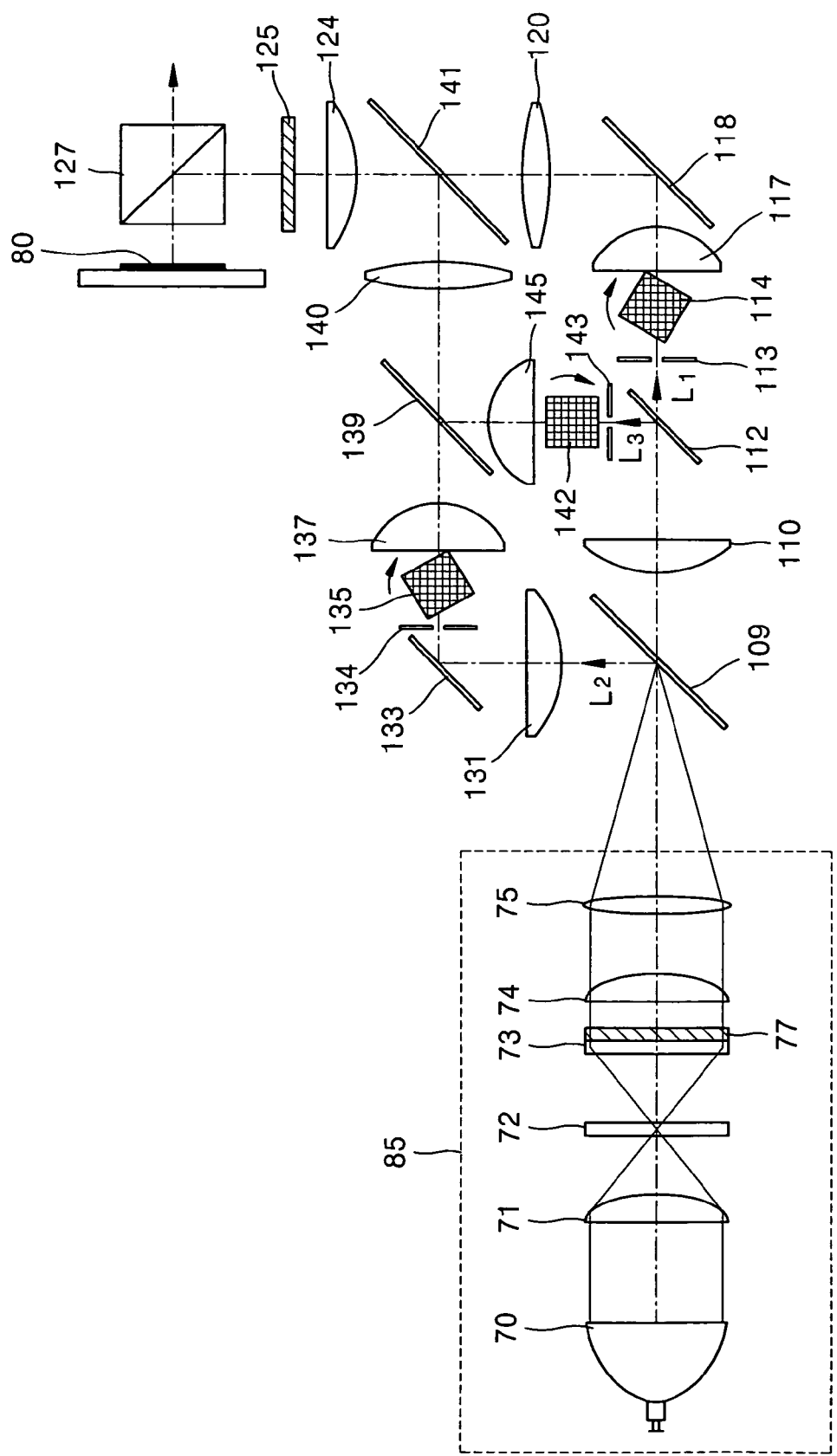
FIG. 7 is a schematic diagram of a projection system using the illumination system of FIG. 6.

Referring to FIG. 7, a projection system according to an exemplary embodiment of the present invention includes an illumination system 85, which is the illumination system of FIG. 6, a color separator, a scrolling unit, and a light valve 80. The illumination system 85 emits light having a Gaussian distribution with respect to a predetermined direction. The color separator separates the light emitted from the illumination system 85 according to color. The scrolling unit scrolls color beams obtained by the color separator. The light valve 80 processes the color beams passed through the color separator and the scrolling unit according to an input image signal and forms a color image.

The illumination system 85 includes a light source 70, first and second cylindrical lens arrays 72 and 73, for turning light emitted from the light source 70 into light having a Gaussian distribution, and a relay lens 75. The illumination system 85 may further include a first cylinder lens 71 disposed on a light path between the light source 70 and the first cylindrical lens array 72, and a second cylinder lens 74 disposed either on a light path between the first and second cylindrical lens arrays 72 and 73 or between the second cylindrical lens array 73 and the relay lens 75. To use light having a single polarization, the illumination system 85 may further include a polarization conversion system 77 disposed between the second cylindrical lens array 73 and the second cylinder lens 74.

Since the functional effect of the illumination system 85 was already described above, the description thereof will be omitted. The illumination system 85 provides light having a Gaussian distribution with respect to a color separation direction or a color bar scrolling direction.

The color separator includes first and second dichroic filters 109 and 112. The first dichroic filter 109 reflects a first color beam, for example, of the light emitted from the illumination system 85 and transmits the other color beams. The second dichroic filter 112 reflects a second color beam of the beams transmitted by the first dichroic filter 109 and transmits a third color beam.

The scrolling unit includes first, second, and third prisms 114, 135, and 142 rotatably disposed on first, second, and third light paths $L_1$, $L_2$, and $L_3$, respectively. The first color beam travels along the first light path $L_1$, the second color beam travels along the second light path $L_2$, and the third color beam travels along the third light path $L_3$.

The color beams separated by the first and second dichroic filters 109 and 112 are incident on the light valve 80 and processed according to an input image signal by the light valve 80 to form a color image. At least one light path changer is included so that the first, second, and third color beams separated by the first and second dichroic filters 109 and 112 and traveling along different paths can be directed toward the light valve 80.

The light path changer may include a first reflection mirror 118, which reflects the first color beam traveling along the first light path $L_1$, and a second reflection mirror 133, which reflects the second color beam traveling along the second light path $L_2$. The light path changer may further include a third dichroic filter 139, which transmits the second color beam traveling along the second light path $L_2$ and reflects the third color beam traveling along the third light path $L_3$, and a fourth dichroic filter 141, which transmits the first color beam and reflects the second and third color beams so that the first, second, and third color beams travel in the same direction.

Light path difference compensating lenses 110, 117, 131, 137, and 145 are disposed along the first through third light paths $L_1$, $L_2$, and $L_3$. First and second condensing lenses 120 and 140 are disposed between the first reflection mirror 118 and the fourth dichroic filter 114 and between the third and fourth dichroic filters 139 and 141, respectively. A polarization beam splitter 127 is included to reflect or transmit the first, second, and third color beams combined by the fourth dichroic filter 141 according to a polarization direction and transfer resultant color beams to the light valve 80. A third focusing lens 124 and a polarizer 125 are disposed on the light path between the fourth dichroic filter 122 and the polarized beam splitter 127. The polarized beam splitter 127 may be replaced by a wire grid polarized beam splitter.

Figure 8A:
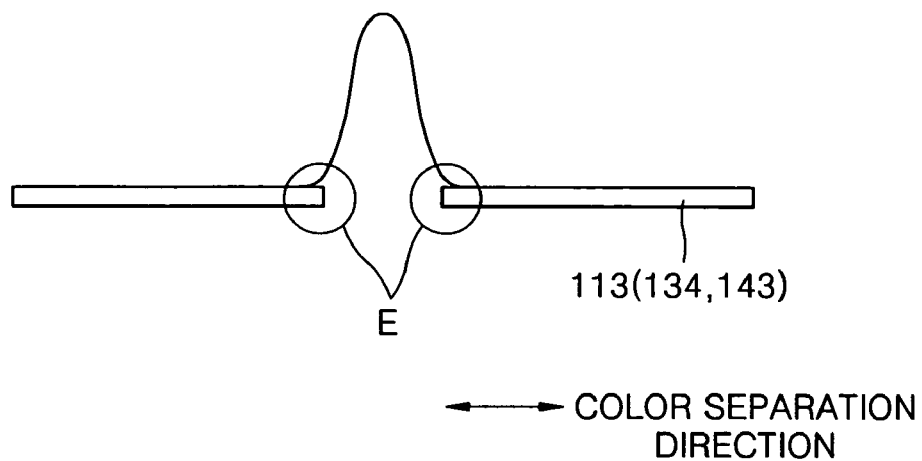
FIG. 8A illustrates a distribution of light incident upon a slit of FIG. 7.

First, second, and third slits 113, 134, and 143 are installed in front of the first, second, and third prisms 114, 135, and 142, respectively, and control the etendue of an optical system or the divergence angles of the first, second, and third color beams, respectively. The first, second, and third slits 113, 134, and 143 are preferably disposed so that widths (w) can be controlled in a direction in which light is separated by the first and second dichroic filters 109 and 112 according to color. Light with a Gaussian distribution provided by the illumination system 85 is incident upon each of the first, second, and third slits 113, 134, and 143 as illustrated in FIG. 8A. Hence, both edge portions E of the Gaussian distribution are removed by each of the first, second, and third slits 113, 134, and 143.

Figure 8B:
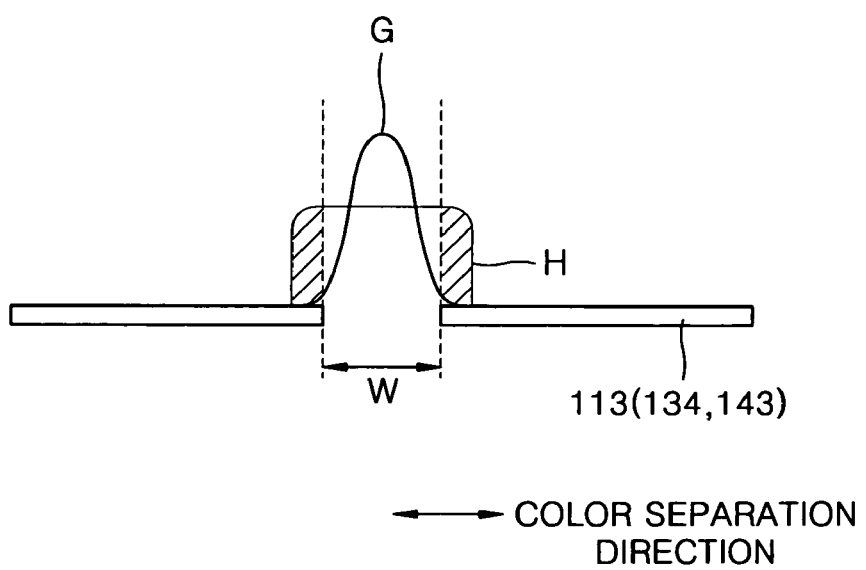
FIG. 8B illustrates a difference between distributions of light incident upon a slit in a projection system according to the present invention and in a conventional projection system and a difference between the amounts of light removed by the slit in the projection system according to the present invention and in the conventional projection system.

FIG. 8B compares the amount of light (which is a hatched portion) removed from light having a Gaussian distribution G by each of the first, second, and third slits 113, 134, and 143 with that removed from light having a square distribution H. Referring to FIG. 8B, a larger amount of light is removed from the light having the Gaussian distribution G than from the light having the square distribution H. The widths of color bars formed on the light valve 80 depend on a width (w) of each of the first, second, and third slits 113, 134, and 143.

Figure 8C:
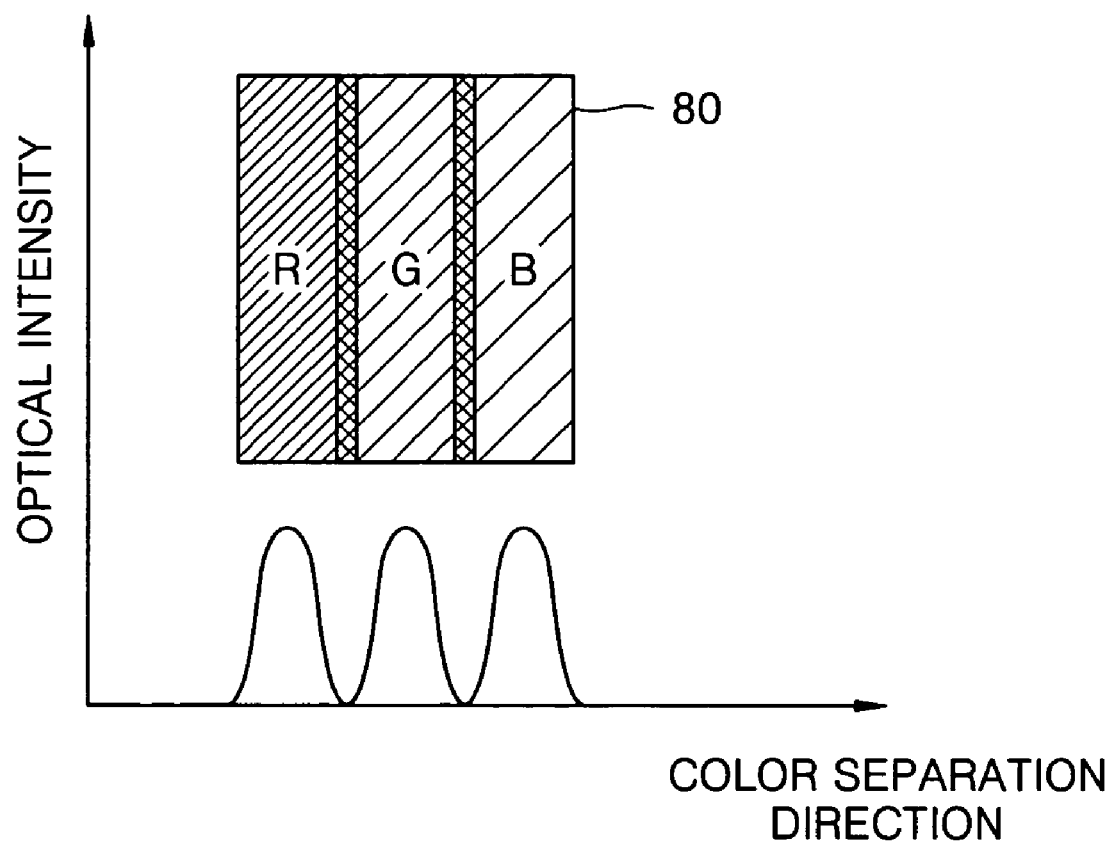
FIG. 8C is used to illustrate a method of forming a color image according to an exemplary embodiment of the present invention.

Light beams passed through the first, second, and third slits 113, 134, and 143 are incident on different locations of the light valve 80, thereby forming R, G, and B color bars. The R, G, and B color bars formed on the light valve 80 and an optical intensity distribution for each of the R, G, and B color bars versus a color separation direction are shown in FIG. 8C. The R, G, and B color bars formed on the light valve 80 have Gaussian distributions in the color separation direction (or a color scrolling direction) and square distributions in the length direction of the R, G, and B color bars. Since light having a Gaussian distribution in the color separation direction passes through each of the first, second, and third slits 113, 134, and 143, the efficiency of light incident on the light valve 80 can be increased.

A color image forming method according to an exemplary embodiment of the present invention includes the steps of turning light emitted from the light source 70 into light having a Gaussian distribution in a predetermined direction, of separating the light having a Gaussian distribution into a plurality of color beams, and of controlling the divergence angle of each of the color beams or the etendue of an optical system by passing the color beams through corresponding slits. To have a Gaussian distribution in the color separation direction, rays of the light emitted from the light source 70 are combined in a direction perpendicular to the color separation direction, and most of the light is concentrated on an incident light axis in the color separation direction.

In particular, referring to FIG. 4, the light emitted from the light source 70 is converged in one direction by the first cylinder lens 71 and then divided into a plurality of beams by each of the lens cells 72a of the first cylindrical lens array 72. the divided beams are mixed by the second cylindrical lens array 73 in one direction, and most of the mixed light is concentrated on an incident light axis by the relay lens 75. The light emitted from the illumination system has a Gaussian distribution, more specifically, a Gaussian distribution in the color separation direction.

As shown in FIG. 5A, the lens cells 72a and 73a of the first and second cylindrical lens arrays 72 and 73 are arranged parallel to one another in an identical direction. Light rays incident upon the first and second cylindrical lens arrays 72 and 73 are combined by each of the lens cells 72a and 73a in the arrangement direction (i.e., direction z) of the lens cells 72a and 73a and thus have a square distribution in direction z. On the other hand, as shown in FIG. 5B, the light rays incident upon the first and second cylindrical lens arrays 72 and 73 are not combined in the length direction (i.e., direction y) of the lens cells 72a and 73a, and most of the light rays are concentrated on an incident light axis by the second cylinder lens 74 and the relay lens 75. Thus, the light passed through the relay lens 75 has a Gaussian distribution. Preferably, the length direction (i.e., direction y) of the lens cells 72a and 73a is the same as the color separation direction.

Preferably, the second cylinder lens 74 is disposed between the first and second cylindrical lens arrays 72 and 73 or behind the second cylindrical lens array 73 so as to collimate light diverging while passing through the first cylindrical lens array 72.

As described above, the light having a Gaussian distribution in the color separation direction (or the color scrolling direction) is separated into a plurality of color beams by a color separator. The divergence angle of each of the color beams or the etendue of an optical system is controlled by each of the first, second, and third slits 113, 134, and 143, which are disposed on the path along which the color beams travel. Since each of the color beams incident upon the first, second, and third slits 113, 134, and 143 has a Gaussian distribution, a small amount of light is removed from each of the color beams by each of the first, second, and third slits 113, 134, and 143. Preferably, the width direction of each of the first, second, and third slits 113, 134, and 143 is the color separation direction, and the widths of the first, second, and third slits 113, 134, and 143 are controllable. The widths of the color bars formed on the light valve 80 depend on the widths of the first, second, and third slits 113, 134, and 143.

Since a small amount of light is removed from each of the color beams by each of the first, second, and third slits 113, 134, and 143, the optical efficiency of a color image formed by the above-described method is high.

According to the above-described illumination system and the color image forming method according to an exemplary embodiment of the present invention, light with a Gaussian distribution in the color separation direction is incident upon the first, second, and third slits 113, 134, and 143, such that much of the light is incident on the light valve 80 without a large light loss. Thus, light efficiency is improved. Color bars formed on the light valve 80 are processed according to an input image signal to form a picture. The formed picture is magnified by a projection lens unit (not shown) and is projected onto a screen (not shown).

As described above, in a projection system adopting an illumination system according to an exemplary embodiment of the present invention, light passed through slits for controlling the divergence angle of incident light or the etendue of an optical system has a Gaussian distribution in a color separation direction (or a color scrolling direction). Thus, light efficiency can be improved.

Also, in a color image forming method according to an exemplary embodiment of the present invention, light having a Gaussian distribution in a color separation direction is incident upon slits, and the widths of color bars are controlled using the slits. Thus, a highly efficient color image can be formed.

What is claimed is:

1. An illumination system comprising:
   a light source;
   a first cylindrical lens array including a plurality of first cylindrical lens cells which divide light emitted from the light source into a plurality of beams;
   a second cylindrical lens array including a plurality of second cylindrical lens cells which combine the beams divided by the first cylindrical lens cells in a same direction; and
   a relay lens which relays the beams combined by the second cylindrical lens cells so that a majority of the beams concentrate on an incident light axis to have a Gaussian distribution;
   a first cylinder lens which is disposed between the light source and the first cylindrical lens array, and converges the light emitted from the light source; and
   a second cylinder lens which is disposed between the first and second cylindrical lens arrays or behind the second cylindrical lens array, and collimates incident light.

2. The illumination system of claim 1, wherein the first and second cylindrical lens cells are arranged in a direction perpendicular to a thickness direction of the first and second cylinder lenses.

3. The illumination system of claim 1, further comprising a polarization conversion system which is disposed on a light path between the first cylinder lens and the relay lens, and converts incident light into light having a single polarization.

4. A projection system comprising:
   an illumination system;
   a color separator which separates light emitted from the illumination system into a plurality of color beams;
   a scrolling unit which scrolls the color beams obtained by the color separator; and
   a light valve which processes the color beams scrolled by the scrolling unit to form a color image,
   the illumination system comprising:
   a light source;
   a first cylindrical lens array including a plurality of first cylindrical lens cells which divide light emitted from the light source into a plurality of beams;
   a second cylindrical lens array including a plurality of second cylindrical lens cells which combine the beams divided by the cylindrical lens cells in a same direction; and
   a relay lens which relays the beams combined by the second cylindrical lens cells so that a majority of the beams are concentrated on an incident light axis to have a Gaussian distribution;
   a first cylinder lens which is disposed between the light source and the first cylindrical lens array, and converges the light emitted from the light source; and
   a second cylinder lens which is disposed between the first and second cylindrical lens arrays or behind the second cylindrical lens array, and collimates incident light.

5. The projection system of claim 4, wherein the color separator comprises:
   a first dichroic filter which reflects a first color beam of light emitted from the illumination system, and transmits other color beams; and
   a second dichroic filter which reflects a second color beam of the color beams transmitted by the first dichroic filter, and transmits a third color beam.

6. The projection system of claim 4, wherein the scrolling unit comprises a plurality of prisms rotatably disposed on light paths along which the color beams travel, and color scrolling is achieved by rotations of the prisms.

7. The projection system of claim 4, further comprising slits which are disposed on paths along which the color beams travel and which control the divergence angles of the color beams.

8. The projection system of claim 4, wherein the first and second cylindrical lens cells are arranged in a direction parallel to a color separation direction.

9. The projection system of claim 4, further comprising at least one light path changer which directs the color beams toward the light valve.

10. The projection system of claim 4, wherein the illumination system further comprises a polarization conversion system which is disposed on a light path between the first cylinder lens and the relay lens, and converts incident light into light having a single polarization.

11. A method of forming a color image on a light valve by separating light emitted from a light source into a plurality of color beams via a color separator and by scrolling the color beams via a scrolling unit, the method comprising:
   processing the light emitted from the light source to have a Gaussian distribution in a color separation direction by combining the light emitted from the light source in a direction perpendicular to the color separation direction and concentrating a majority of the light on an incident light axis in the color separation direction; and controlling a divergence angle of the light having a Gaussian distribution via a plurality of slits.

12. The method of claim 11, wherein widths of the color beams are controlled in the color separation direction by adjusting the widths of the slits.

13. The method of claim 11, wherein the processing of the light emitted from the light source to have a Gaussian distribution comprises:

dividing the light emitted from the light source into a plurality of beams via a first cylindrical lens array including first cylindrical lens cells arranged parallel to one another in a color separation direction such that light incident upon the first cylindrical lens cells is divided into a plurality of beams;

combining the beams obtained by the first cylindrical lens array via a second cylindrical lens array including second cylindrical lens cells; and concentrating a majority of the beams combined by the second cylindrical lens array on an incident light axis via a relay lens so that the light emitted from the light source has a Gaussian distribution in the color separation direction.

14. The method of claim 13, wherein the second cylindrical lens cells are arranged in a direction parallel to the color separation direction.

15. The method of claim 13, further comprising:

converging the light emitted from the light source on the first cylindrical lens array via a first cylinder lens; and collimating the combined beams passed through the second cylindrical lens array via a second cylinder lens.

16. The method of claim 15, further comprising converting incident light into light having a single polarization via a polarization conversion system which is disposed on a light path between the first cylinder lens and the relay lens.

17. The method of claim 13, wherein the color separator comprises:

a first dichroic filter which reflects a first color beam of light emitted from the relay lens and transmits other color beams; and a second dichroic filter which reflects a second color beam of the color beams transmitted by the first dichroic filter and transmits a third color beam.

18. The method of claim 17, wherein the scrolling unit includes first, second, and third prisms rotatably disposed on light paths along which the first, second, and third color beams travel, and color scrolling is achieved by rotation of the first, second, and third prisms.

* * * * *